US008662372B2

(12) United States Patent
Burton et al.

(10) Patent No.: US 8,662,372 B2
(45) Date of Patent: *Mar. 4, 2014

(54) APPARATUS FOR FRICTION STIR WELDING USING SPINDLE-IN-SPINDLE

(71) Applicant: The Boeing Company, Chicago, IL (US)

(72) Inventors: Kurt A. Burton, Pacific, MO (US); Mike P. Matlack, St. Charles, MO (US); John Baumann, St. Charles, MO (US); Herb Bommer, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/766,066

(22) Filed: Feb. 13, 2013

(65) Prior Publication Data

US 2013/0186937 A1 Jul. 25, 2013

Related U.S. Application Data

(60) Continuation of application No. 13/221,255, filed on Aug. 30, 2011, now Pat. No. 8,434,660, which is a division of application No. 11/829,897, filed on Jul. 28, 2007, now Pat. No. 8,052,030, which is a continuation-in-part of application No. 11/053,630, filed on Feb. 7, 2005, now Pat. No. 7,703,654, which is a continuation-in-part of application No. 11/041,836, filed on Jan. 24, 2005, now Pat. No. 7,641,096.

(60) Provisional application No. 60/849,670, filed on Oct. 5, 2006, provisional application No. 60/628,832, filed on Nov. 17, 2004.

(51) Int. Cl.
B23K 20/12 (2006.01)

(52) U.S. Cl.
USPC .......................................... 228/2.1; 228/112.1

(58) Field of Classification Search
USPC ............................................... 228/2.1, 112.1
See application file for complete search history.

(56) References Cited

U.S. PATENT DOCUMENTS 1,744,964 A 1/1930 Hansen
4,932,280 A 6/1990 Becker et al.
(Continued)

FOREIGN PATENT DOCUMENTS

EP 1557233 A2 7/2005
JP 2002120076 A 4/2002
(Continued)

OTHER PUBLICATIONS

International Search Report, dated Apr. 6, 2006, regarding Application No. PCT/US2005/041278 (WO2006055530), 3 pages.

(Continued)

Primary Examiner — Nicholas P D'Aniello
(74) Attorney, Agent, or Firm — Yee & Associates, P.C.

(57) ABSTRACT

A spindle head for performing friction stir welding includes concentric spindle shafts driven by stacked, coaxial motors contained within a spindle housing. The coaxial arrangement of the motors results in a more compact package. Each of the motors is concentrically arranged around one of the spindles by directly connecting a rotor of the motor to a spindle shaft. The stators of the motors are mounted on the housing and are concentrically arranged around the concentric spindle shafts.

19 Claims, 9 Drawing Sheets

(56) References Cited

U.S. PATENT DOCUMENTS

| | | | |
|---|---|---|---|
| 5,460,317 | A | 10/1995 | Thomas et al. |
| 5,697,544 | A | 12/1997 | Wykes |
| 5,893,507 | A | 4/1999 | Ding et al. |
| 6,199,745 | B1 | 3/2001 | Campbell et al. |
| 6,264,088 | B1 | 7/2001 | Larsson |
| 6,328,261 | B1 | 12/2001 | Wollaston et al. |
| 6,421,578 | B1 | 7/2002 | Adams et al. |
| 6,499,649 | B2 | 12/2002 | Sayama et al. |
| 6,554,175 | B1 | 4/2003 | Thompson |
| 6,732,900 | B2 | 5/2004 | Hansen et al. |
| 6,742,696 | B2 | 6/2004 | Thompson |
| 6,874,672 | B2 | 4/2005 | Okamoto et al. |
| 6,908,690 | B2 | 6/2005 | Waldron et al. |
| 7,234,625 | B2 | 6/2007 | Loitz et al. |
| 7,322,509 | B2 | 1/2008 | Sato |
| 7,641,096 | B2 | 1/2010 | Burton et al. |
| 7,703,654 | B2 | 4/2010 | Burton et al. |
| 8,052,030 | B2 | 11/2011 | Burton et al. |
| 8,205,785 | B2 | 6/2012 | Burton et al. |
| 8,434,660 | B2 * | 5/2013 | Burton et al. ............ 228/112.1 |
| 2003/0201307 | A1 | 10/2003 | Waldron et al. |
| 2003/0209586 | A1 | 11/2003 | Thompson |
| 2005/0045695 | A1 | 3/2005 | Subramanian et al. |
| 2005/0189398 | A1 | 9/2005 | Sato |
| 2006/0102699 | A1 | 5/2006 | Burton et al. |
| 2006/0163316 | A1 | 7/2006 | Burton et al. |
| 2007/0228104 | A1 | 10/2007 | Mankus et al. |
| 2007/0267462 | A1 | 11/2007 | Burton et al. |
| 2009/0223621 | A1 | 9/2009 | Burton et al. |
| 2011/0308700 | A1 | 12/2011 | Burton et al. |

FOREIGN PATENT DOCUMENTS

| | | | |
|---|---|---|---|
| JP | 2003311441 | A | 11/2003 |
| WO | WO9956920 | A1 | 11/1999 |
| WO | WO0128732 | A1 | 4/2001 |
| WO | WO03064100 | A1 | 8/2003 |
| WO | WO2006055530 | A1 | 5/2006 |
| WO | WO2006081153 | A1 | 8/2006 |

OTHER PUBLICATIONS

International Search Report, dated Jun. 13, 2006, regarding Application No. PCT/US2006/002171 (WO2006081153), 2 pages.
Watts et al., "Dual-rotation Stir Welding—Preliminary trials," TWI Ltd., Apr. 8, 2004, 6 pages. Retrieved May 1, 2012 from http://www.twi.co.uk/services/technical-information/published-papers/dual-rotation-stir-welding-preliminary-trials-april-2004/?locale=en.
Office Action, dated Jul. 25, 2007, regarding U.S. Appl. No. 11/041,836, 13 pages.
Final Office Action, dated Jan. 2, 2008, regarding U.S. Appl. No. 11/041,836, 8 pages.
Office Action, dated Jul. 11, 2008, regarding U.S. Appl. No. 11/041,836, 7 pages.
Final Office Action, dated Jan. 7, 2009, regarding U.S. Appl. No. 11/041,836, 8 pages.
Notice of Allowance, dated Aug. 20, 2009, regarding U.S. Appl. No. 11/041,836, 11 pages.
Office Action, dated Dec. 11, 2007, regarding U.S. Appl. No. 11/053,630, 14 pages.
Final Office Action, dated Apr. 28, 2008, regarding U.S. Appl. No. 11/053,630, 7 pages.
Office Action, dated Aug. 8, 2008, regarding U.S. Appl. No. 111053,630, 9 pages.
Final Office Action, dated Dec. 3, 2008, regarding U.S. Appl. No. 11/053,630, 9 pages.
Office Action, dated Apr. 30, 2009, regarding U.S. Appl. No. 11/053,630, 8 pages.
Notice of Allowance, dated Nov. 24, 2009, regarding U.S. Appl. No. 11/053,630, 10 pages.
Office Action, dated Feb. 24, 2010, regarding U.S. Appl. No. 12/467,895, 11 pages.
Final Office Action, dated Aug. 5, 2010, regarding U.S. Appl. No. 12/467,895, 12 pages.
Notice of Allowance, dated Feb. 16, 2012, regarding U.S. Appl. No. 12/467,895, 9 pages.
Supplemental Notice of Allowance, dated Apr. 25, 2012, regarding U.S. Appl. No. 12/467,895, 9 pages.
Office Action, dated Apr. 30, 2009, regarding U.S. Appl. No. 11/829,897, 10 pages.
Final Office Action, dated Oct. 9, 2009, regarding U.S. Appl. No. 11/829,897, 11 pages.
Final Office Action, dated Feb. 18, 2010, regarding U.S. Appl. No. 11/829,897, 9 pages.
Office Action, dated Feb. 16, 2011, regarding U.S. Appl. No. 11/829,897, 11 pages.
Notice of Allowance, dated Jul. 8, 2011, regarding U.S. Appl. No. 11/829,897, 8 pages.
Office Action, dated Sep. 22, 2011, regarding U.S. Appl. No. 13/221,255, 13 pages.
Final Office Action, dated Jan. 30, 2012, regarding U.S. Appl. No. 13/221,255, 10 pages.
Office Action, dated May 17, 2012, regarding U.S. Appl. No. 13/221,255, 19 pages.
Notice of Allowance, dated Sep. 6, 2012, regarding U.S. Appl. No. 13/221,255, 12 pages.
Burton et al., "Counter-Rotating Spindle for Friction Stir Welding," U.S. Appl. No. 13/531,854, filed Jun. 25, 2012, 21 pages.
Notice of Allowance, dated Oct. 30, 2012, regarding U.S. Appl. No. 13/531,854, 15 pages.
Notice of Allowance, dated Jan. 4, 2013, regarding U.S. Appl. No. 13/221,255, 16 pages.

* cited by examiner

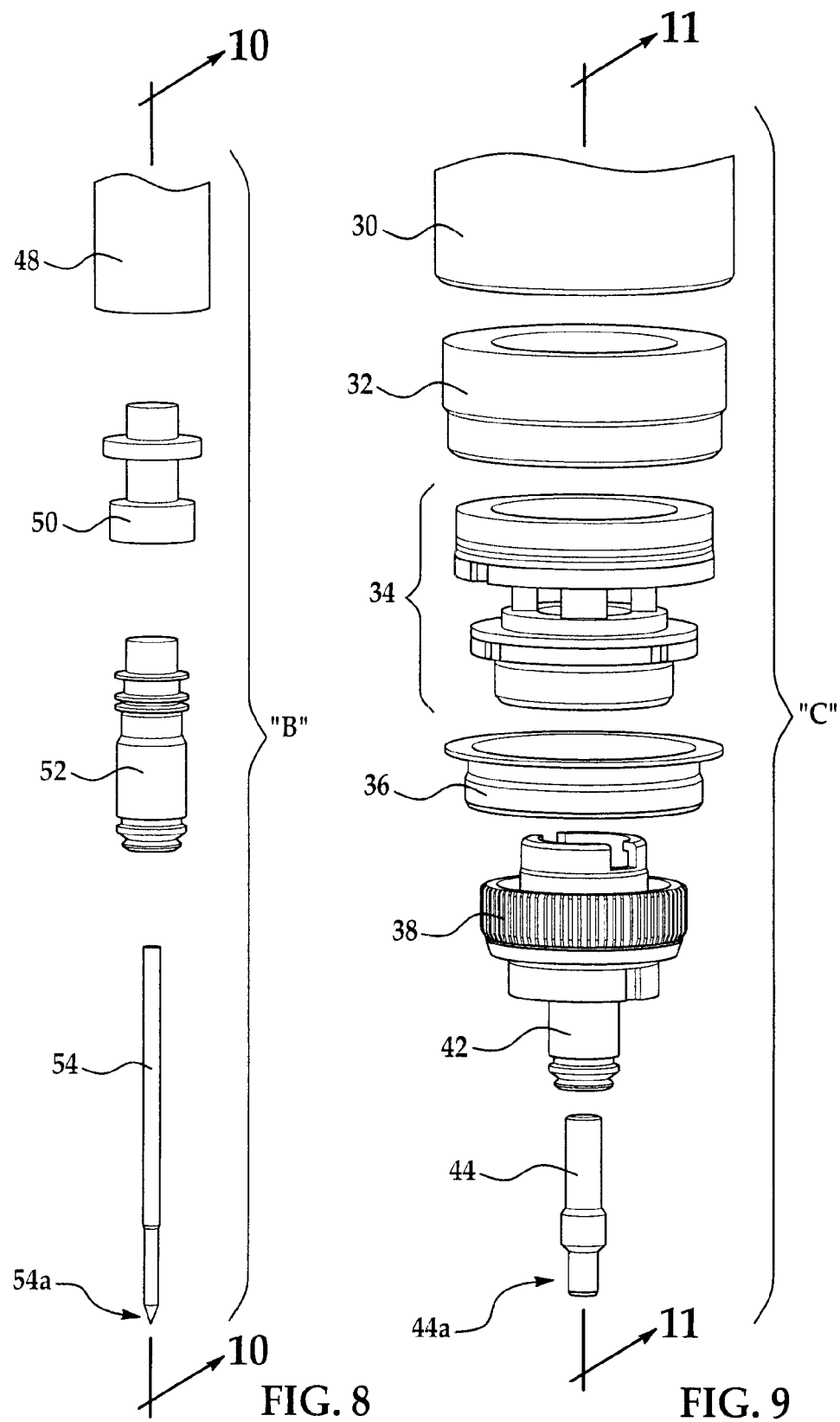

APPARATUS FOR FRICTION STIR WELDING USING SPINDLE-IN-SPINDLE

CROSS REFERENCE TO RELATED APPLICATIONS

This application is a continuation of U.S. patent application Ser. No. 13/221,255, filed Aug. 30, 2011; U.S. patent application Ser. No. 13/221,255 is a division of U.S. patent application Ser. No. 11/829,897, filed Jul. 28, 2007, granted as U.S. Pat. No. 8,052,030, issued on Nov. 8, 2011; U.S. patent application Ser. No. 11/829,897 claims the benefit of Provisional U.S. Patent Application No. 60/849,670, filed Oct. 5, 2006; U.S. patent application Ser. No. 11/829,897 is a continuation-in-part of U.S. patent application Ser. No. 11/053,630, filed Feb. 7, 2005, granted as U.S. Pat. No. 7,703,654, issued on Apr. 27, 2010; U.S. patent application Ser. No. 11/829,897 is a continuation-in-part of U.S. patent application Ser. No. 11/041,836, filed Jan. 24, 2005, granted as U.S. Pat. No. 7,641,096, issued on Jan. 5, 2010; U.S. patent application Ser. No. 11/053,630 claims the benefit of Provisional U.S. Patent Application No. 60/628,832, filed Nov. 17, 2004; the entire disclosures of each of the above mentioned applications are hereby incorporated by reference.

BACKGROUND INFORMATION

1. Field

This disclosure generally relates to spindle heads used in friction stir welding machines, and deals more particularly with a compact, spindle-in-spindle head having stacked drive motors.

2. Background

Friction stir welding (FSW) may be used to join two sheets of metal along a weld line without the use of welding filler materials. The weld is created by a combination of frictional heating of the metal by a rotating tool, and mechanical deformation of the weld using a rotating tool. These tools may comprise a retractable pin tool rotatable within an annually shaped shoulder tool. The pin tool and shoulder tool may be connected to concentric spindles which are respectively driven by separate motors. These motors are typically mounted on or near a spindle head and are laterally offset from the spindle axes. The ends of the concentric spindles are coupled with the motors either through gear sets or drive belts.

The spindle head construction described above may not be suitable for some applications due to the bulk of the spindle head caused by the laterally offset motors. For example, FSW machines on which the spindle head is mounted may have structural elements that interfere with the laterally offset motors as the spindle head is moved along multiple axes during a welding operation.

Accordingly, there is a need for a FSW apparatus having a compact spindle head which overcomes the problems discussed above. Embodiments of the disclosure are intended to satisfy this need.

SUMMARY

FSW apparatus may include a spindle head having concentric spindle shafts driven by stacked, coaxial motors contained within a spindle housing. The coaxial arrangement of the motors minimizes lateral projections from the spindle head, resulting in a more compact package that facilitates movement of the spindle head in multiple axes without interfering with other structural elements on the FSW machine. Each of the motors is concentrically arranged around one of the spindles by directly connecting a rotor of the motor to a spindle shaft. The stators of the motors are mounted on the housing and are concentrically arranged around the concentric spindle shafts.

According to one disclosed embodiment, friction stir welding apparatus is provided, comprising: a shoulder tool; a pin tool rotatable within the shoulder tool; a housing; first and second coaxial spindle shafts respectively connected to the shoulder tool and the pin tool; a first motor connected to the first spindle shaft for rotating the shoulder tool; and, a second motor stacked in end-to-end relationship to the first motor for rotating the pin tool. Each of the first and second motors includes a stator secured to and surrounding a corresponding spindle shaft. The motors each may include a stator mounted on the housing and surrounding the corresponding spindle shaft. Encoders may be employed to generate information related to the rotation of the motor and/or spindle shafts. One of the spindle shafts may pass through the motor that drives the other spindle shaft.

According to another disclosed embodiment, friction stir welding apparatus is provided, comprising: a shoulder tool; a pin tool coaxial with and rotatable within the shoulder tool; first and second coaxial spindle shafts respectively connected to the shoulder tool and the pin tool; a first motor surrounding and connected to the first spindle shaft for rotating the shoulder tool; and, a second motor surrounding and connected to the second spindle shaft for rotating the pin tool. The apparatus may include a spindle housing within which the first and second motors are contained in end-to-end relationship to each other.

In accordance with another embodiment, friction stir welding apparatus is provided, comprising: first and second electric motors stacked end-to-end and arranged to drive around a common axis; a shoulder tool, a pin tool rotatable within the shoulder tool around the common axis; a first spindle shaft connecting the shoulder tool with the first motor; and, a second spindle shaft connecting the pin tool with the second motor. The first motor may include a stator, and a rotor secured to the first spindle shaft. The second motor may include a stator and a rotor secured to the second spindle shaft. The first spindle shaft may pass through the second motor.

In accordance with a method embodiment, friction stir welding a workpiece my comprise the steps of: stacking first and second motors end-to-end along a common axis; rotating a pin tool and a shoulder tool using the first and second motors, respectively; and, producing a friction stir weld in the workpiece using the pin tool and the shoulder tool. The pin tool may be rotated inside the shoulder tool. The motors may be stacked by mounting them inside a common housing. The tools may be rotated by coupling the first and second motors respectively through first and second spindle shafts to the pin tool and the shoulder tool.

Other features, benefits and advantages of the disclosed embodiments will become apparent from the following description of embodiments, when viewed in accordance with the attached drawings and appended claims.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 8 is an exploded, isometric illustration of the area designated as "B" in FIG. 6.

FIG. 9 is an exploded, isometric illustration of the area indicated as "C" in FIG. 7.

DETAILED DESCRIPTION

Figure 1:
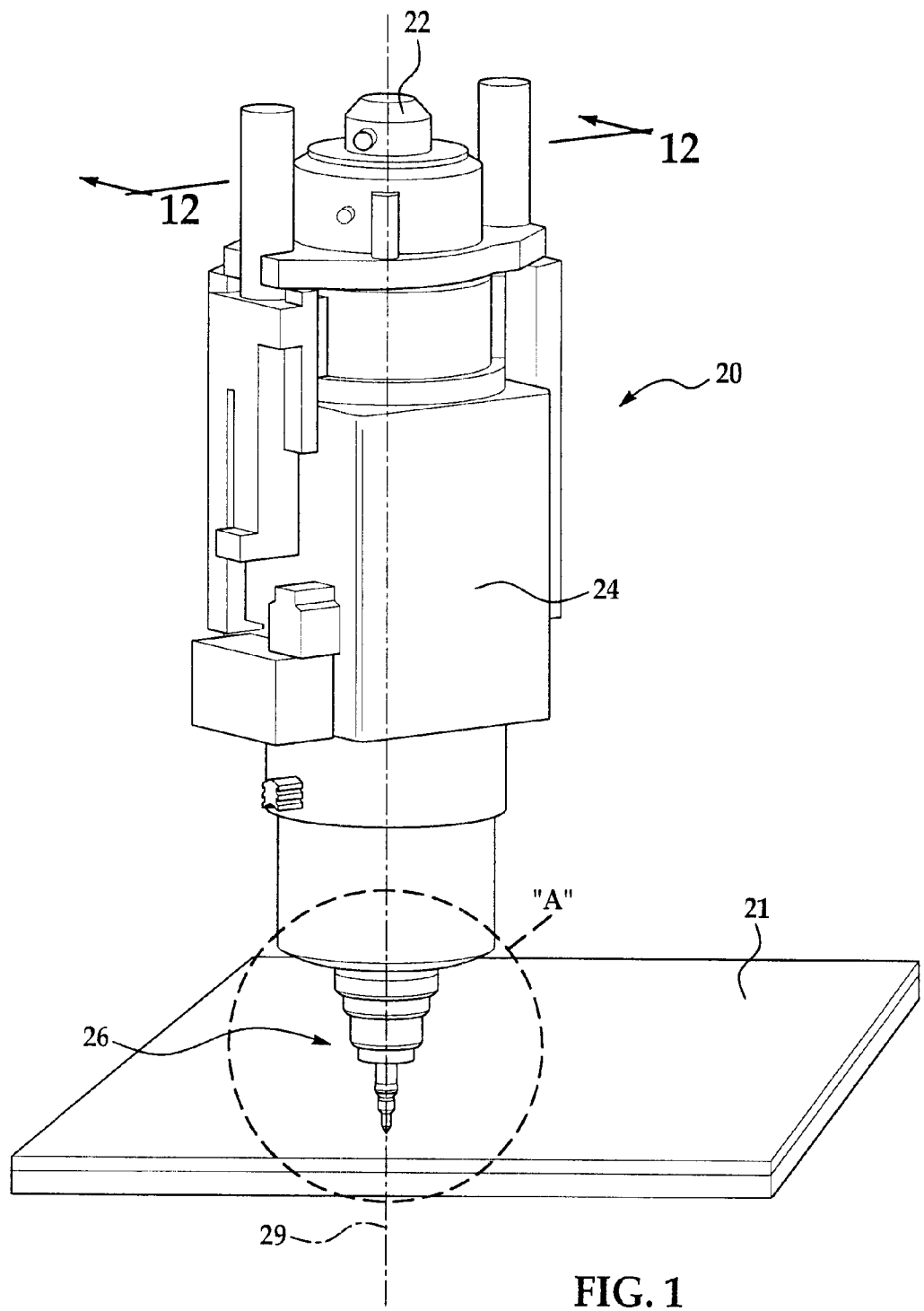
FIG. 1 is an isometric illustration of a spindle head for performing friction stir welding on a workpiece.
Figure 1A:
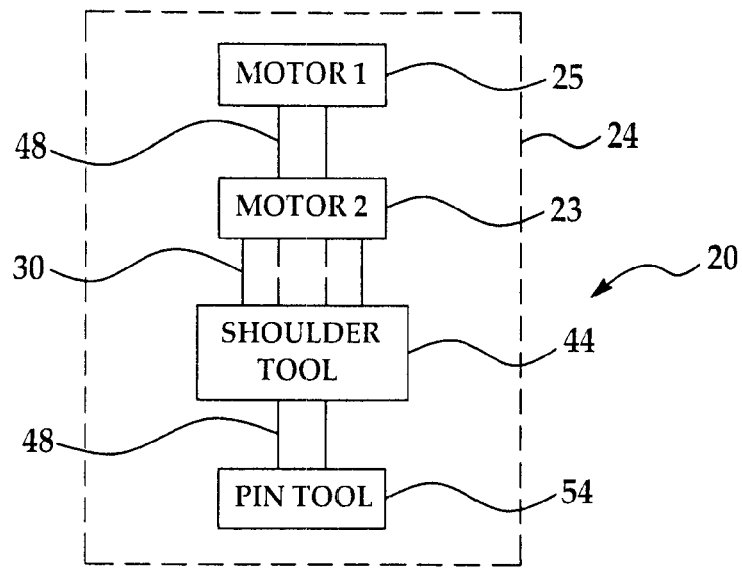
FIG. 1A is a functional block diagram illustration of the spindle head shown in FIG. 1.

Referring first to FIG. 1, a spindle head generally indicated by the numeral 20 includes a spindle housing 24 that may be mounted on a machining center or machine tool (not shown) for movement along multiple axes. The spindle head 20 includes a nosepiece 26 having later discussed tools for performing FSW operations on a workpiece 21. As will be described below, the rotating components of the spindle head 20 are coaxially arranged along a central, longitudinal axis 29.

Figures 6, 7:
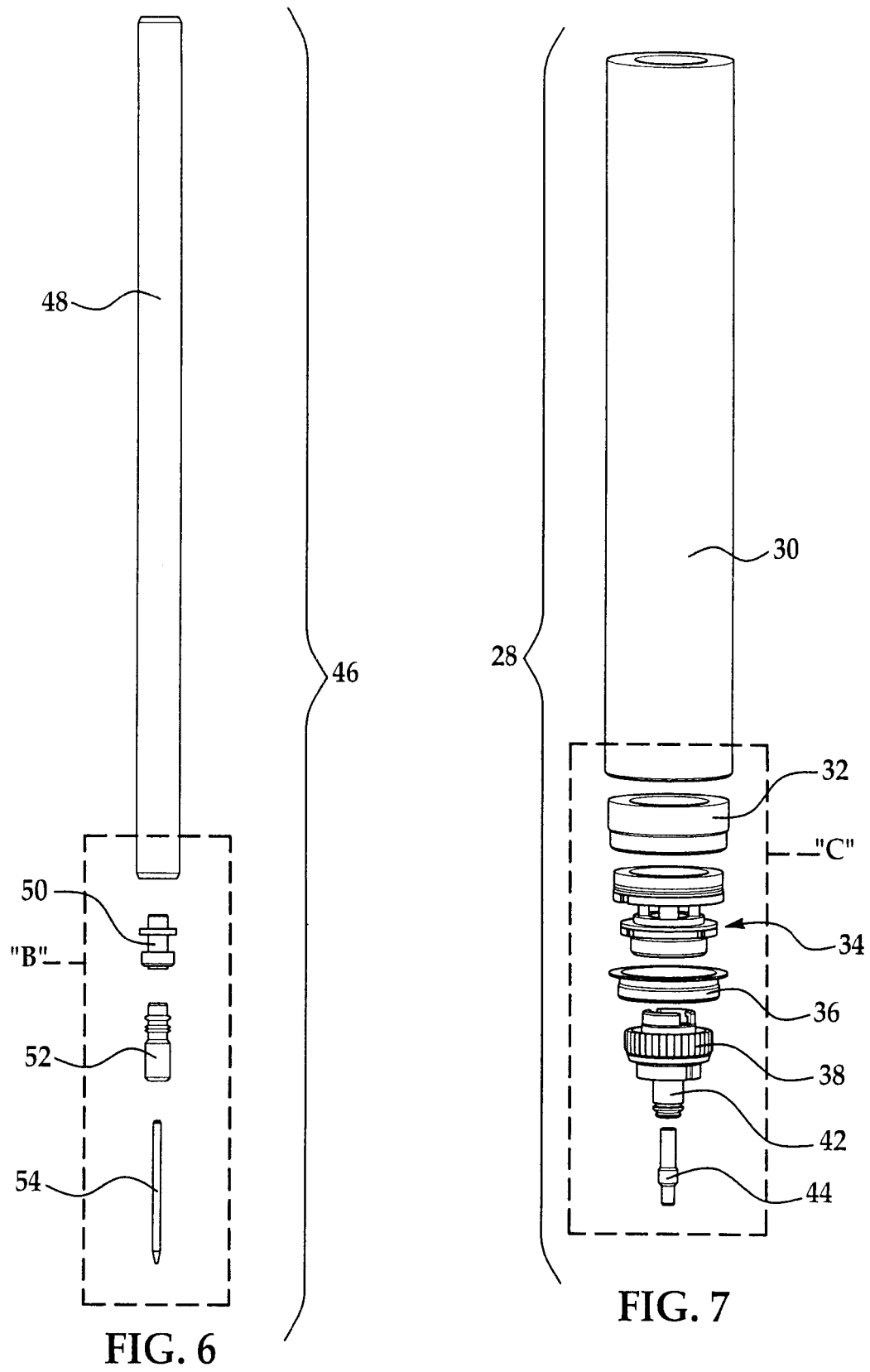
FIG. 6 is an exploded, isometric illustration of the pin tool assembly.
FIG. 7 is an exploded, isometric illustration of the shoulder tool assembly.
Figures 10, 11:
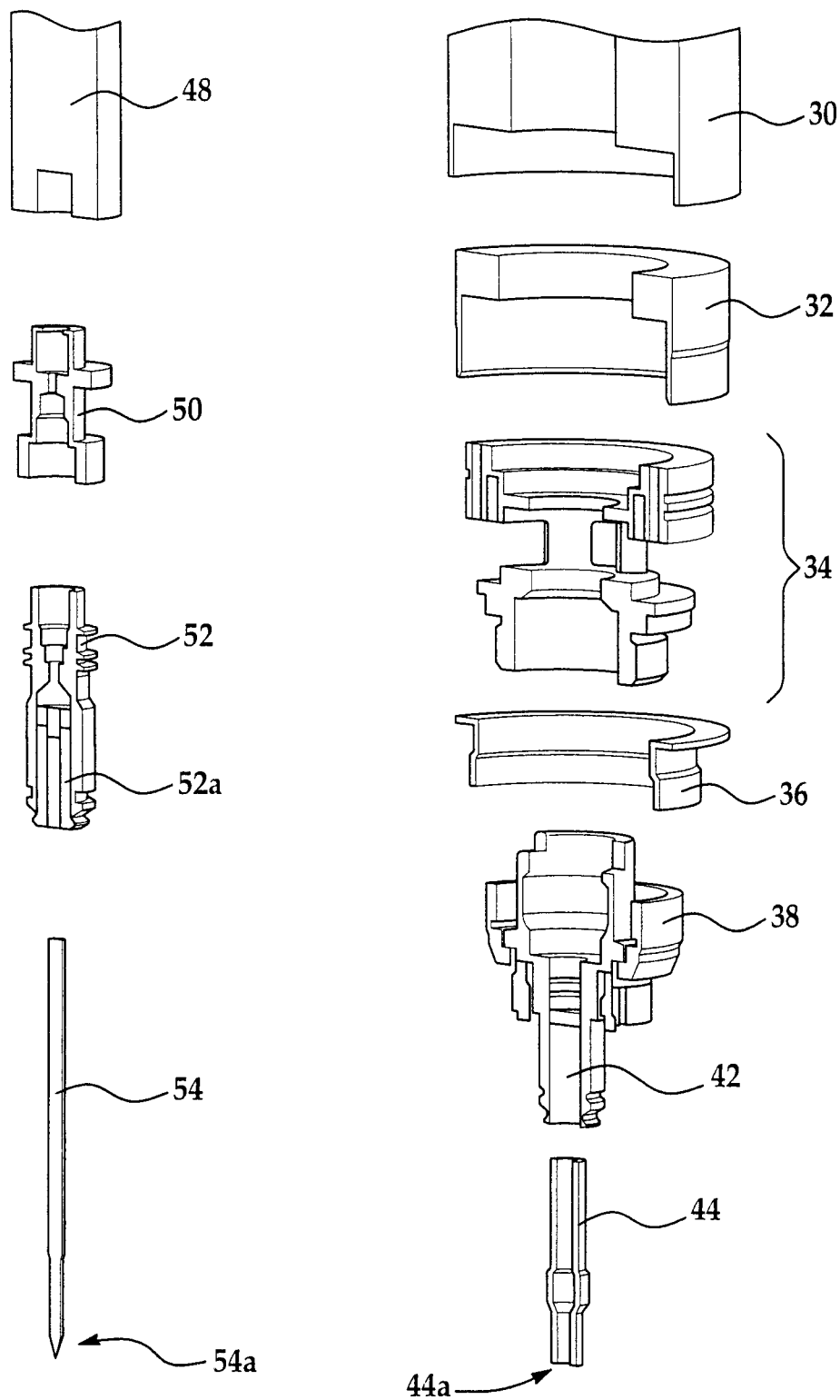
FIG. 10 is an exploded, sectional illustration taken along the line 10-10 in FIG. 8.
FIG. 11 is a sectional illustration taken along the line 11-11 in FIG. 9.

Referring now also to FIGS. 2-12, a rotatable and retractable pin tool assembly 46 is coaxially disposed within a shoulder tool assembly 28 (FIG. 7). The pin tool assembly 46 includes a pin spindle shaft 48 connected with a pin tool 54 through a pin adapter 50 and a pin tool holder 52. The pin tool 54 includes a tip 54a for plunging into the workpiece 21 during a FSW operation.

The shoulder tool assembly 28 may comprise a shoulder spindle shaft 30 connected to a shoulder tool 44 through a spindle-to-adapter interface 32, a shoulder adapter 34, a cover 36, and a shoulder tool holder 38. The shoulder tool holder 38 may include a collet 42 for releasably holding the shoulder tool 44. Shoulder tool 44 may include an annular shoulder 44a that surrounds the tip 54a of the pin tool 54. The pin spindle shaft 48 is linearly displaceable within the shoulder spindle shaft 30, allowing the pin tool 54 to be extended or retracted within the shoulder 44, as may be required by a FSW operation. As previously described, the shoulder 44a functions to forge material in the workpiece 21 as the material is stirred by the pin tool tip 54a. The shoulder tool 44 may rotate in either the same or the opposite direction of the rotation of the pin tool 54.

Figure 2:
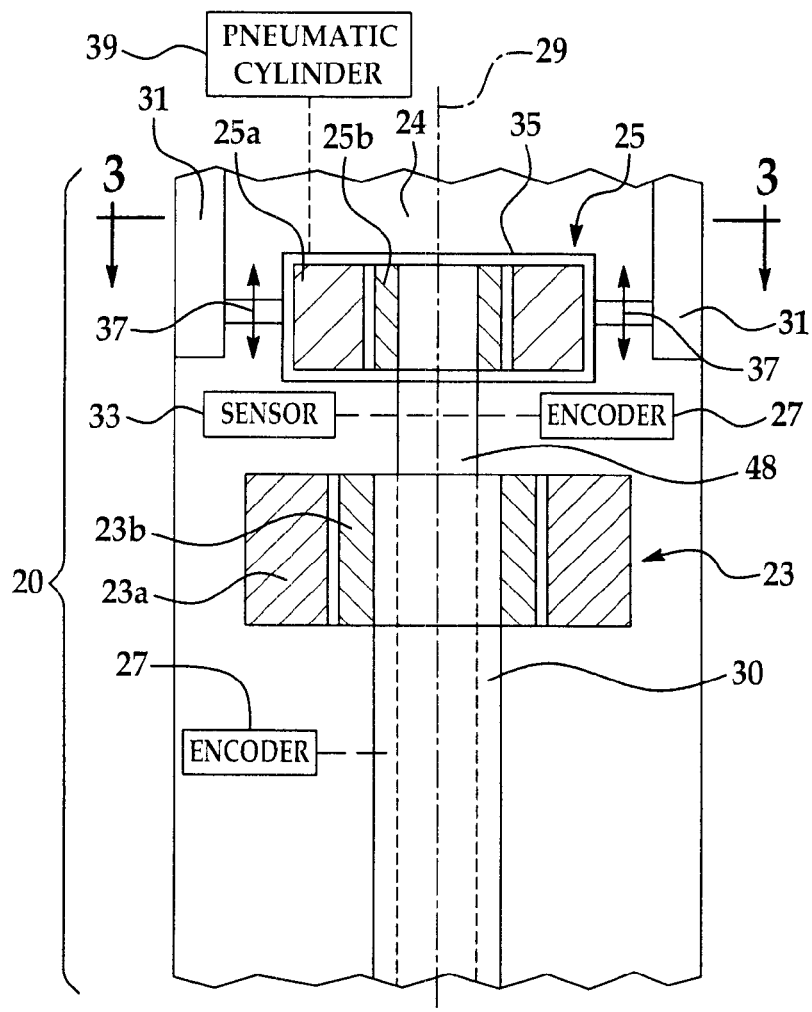
FIG. 2 is a diagrammatic, sectional illustration of the upper portion of the spindle head shown in FIG. 1 showing the relative positions of the motors.
Figure 3:
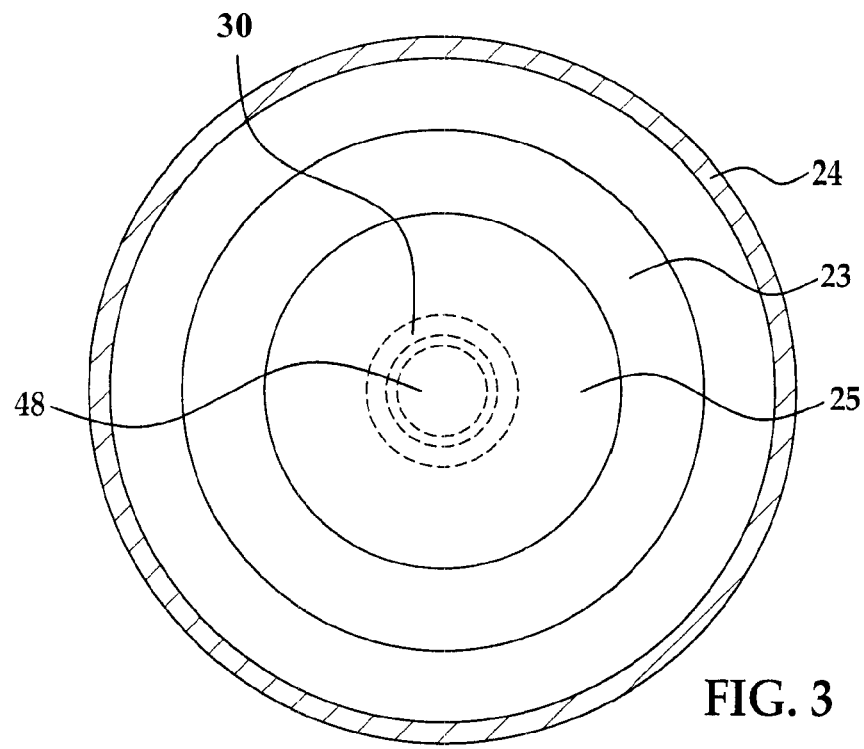
FIG. 3 is a sectional illustration taken along the line 3-3 in FIG. 2.
Figure 4:
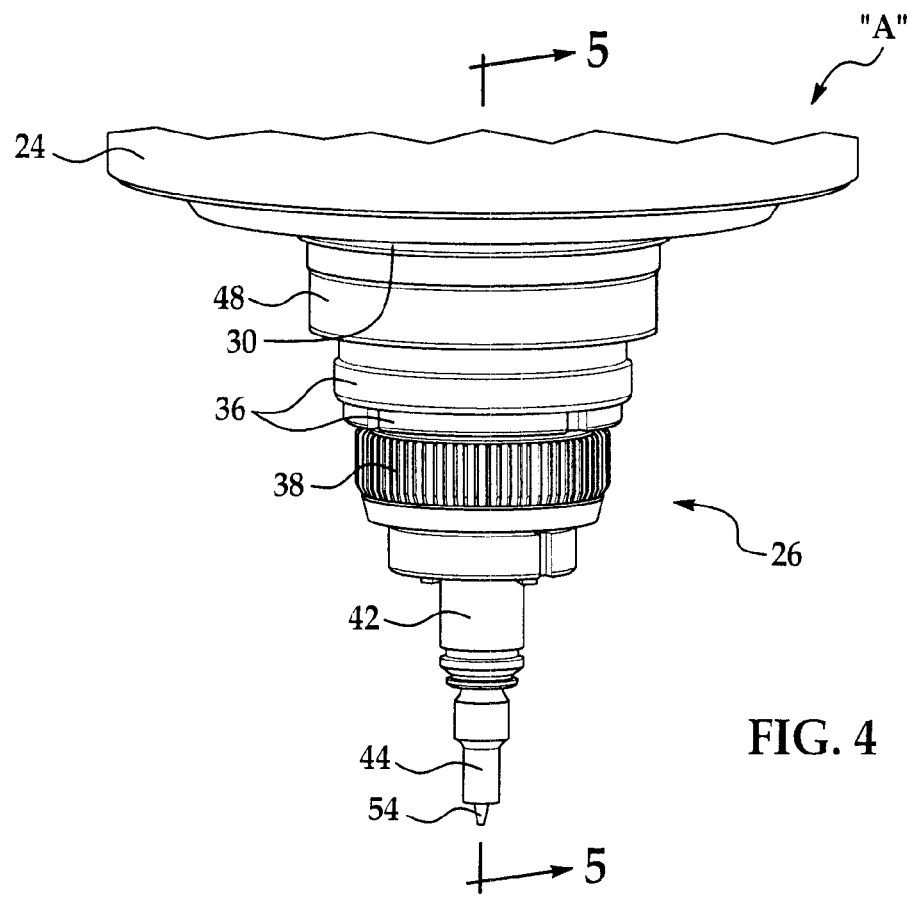
FIG. 4 is an isometric illustration of the area designated as "A" in FIG. 1.
Figure 5:
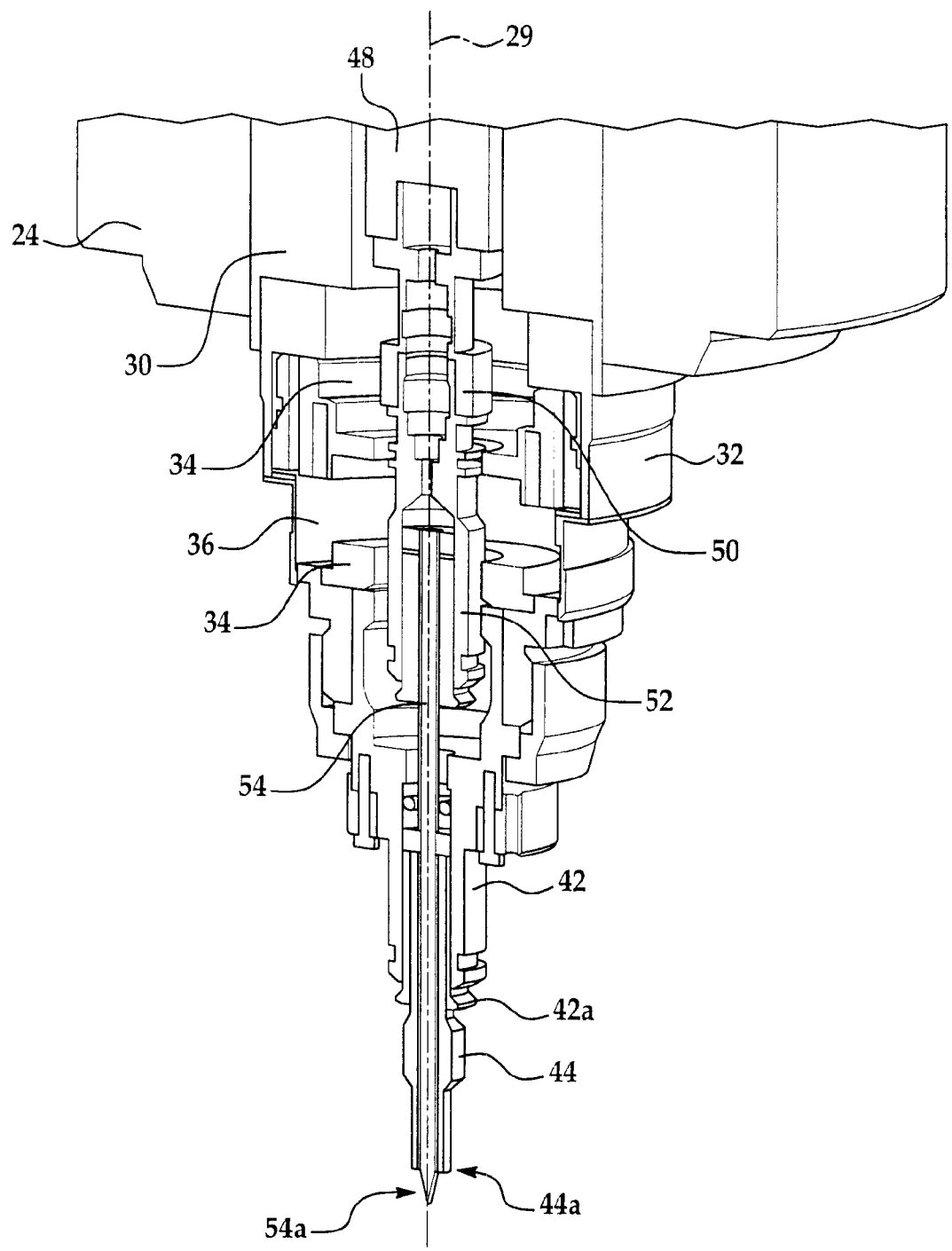
FIG. 5 is a sectional illustration taken along the line 5-5 in FIG. 4.
Figure 12:
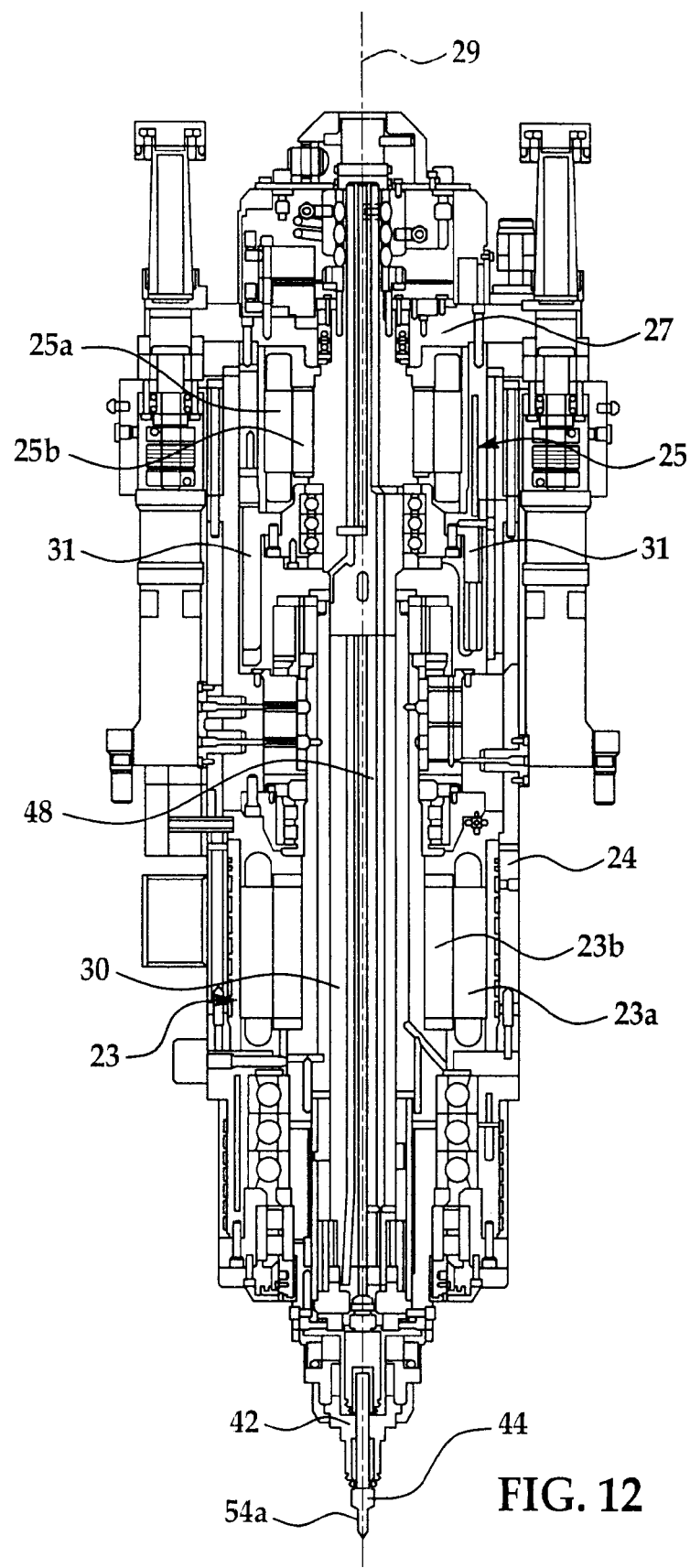
FIG. 12 is a longitudinal sectional illustration taken along the line 12-12 in FIG. 1.

Referring now particularly to FIGS. 2, 3 and 12, first and second motors 23, 25 may be mounted within the spindle housing 24 in stacked, end-to-end relationship and are coaxially arranged along the longitudinal axis 29. The first motor 23 may include a stator 23a secured to the housing 24 by suitable brackets (not shown), and a rotor 23b that may be secured directly to the upper end of the shoulder spindle shaft 30. The second motor 25 may include a housing 35 mounted in a ball cage 31 for linear sliding movement, as shown by the arrows 37 (see FIG. 2). Motor 25 may include a stator 25a secured to the housing 35, and a rotor 25b that may be attached directly to the upper end of the pin tool spindle shaft 48.

As previously described, spindle shafts 30, 48 are coaxial and rotate independently of each other. The pin tool spindle shaft 48 extends through the center of the rotor 23b of motor 23, and is driven to rotate by motor 25. An electric motor and ball screw drive combination or a pneumatic cylinder 39 function to linearly displace the motor 25 along with the pin spindle assembly 46 in order to control the linear displacement position of the pin tool 54. Motor 23 rotates the shoulder tool spindle shaft 30.

Encoders 27 may be provided to sense the rotation of either the spindle shafts 30, 48 or the motors 23, 25 in order to generate signals that may be used by controllers (not shown) to control either the speed of the motors 23, 25 or feed rate of the spindle head 20. The encoders 27 may be incorporated into the construction of the motors 23, 25, if desired. A linear position sensor 33 may be provided to sense the linear position of the pin spindle shaft 48, and thus the position of the pin tool 54.

Figure 13:
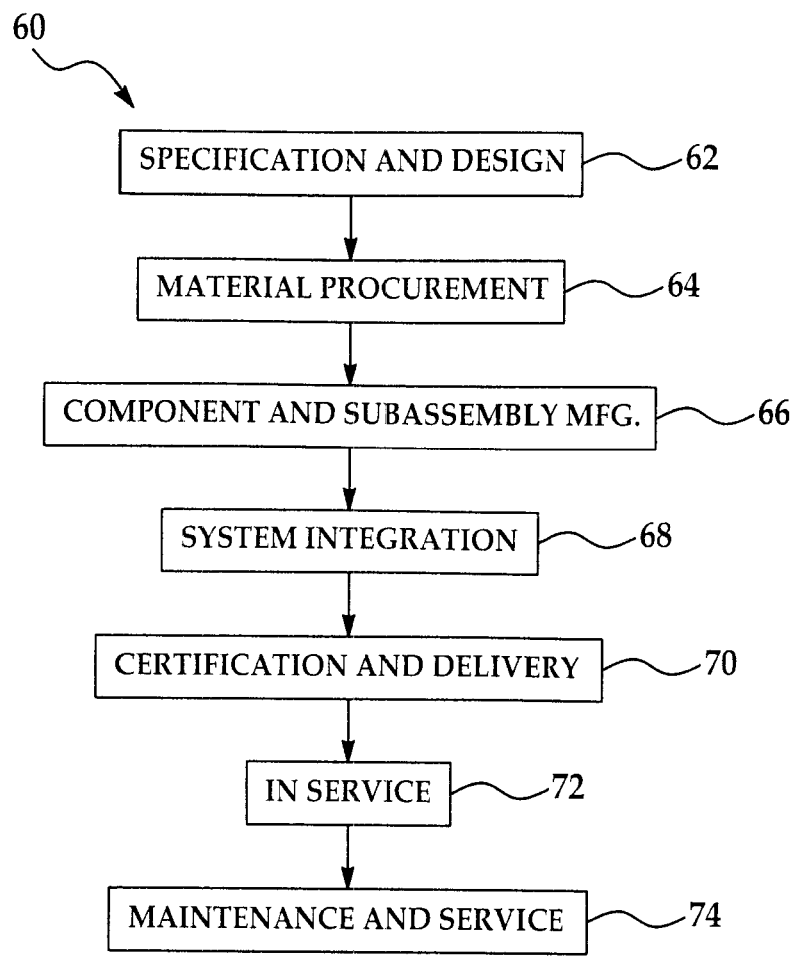
FIG. 13 is a flow diagram of aircraft production and service methodology.
Figure 14:
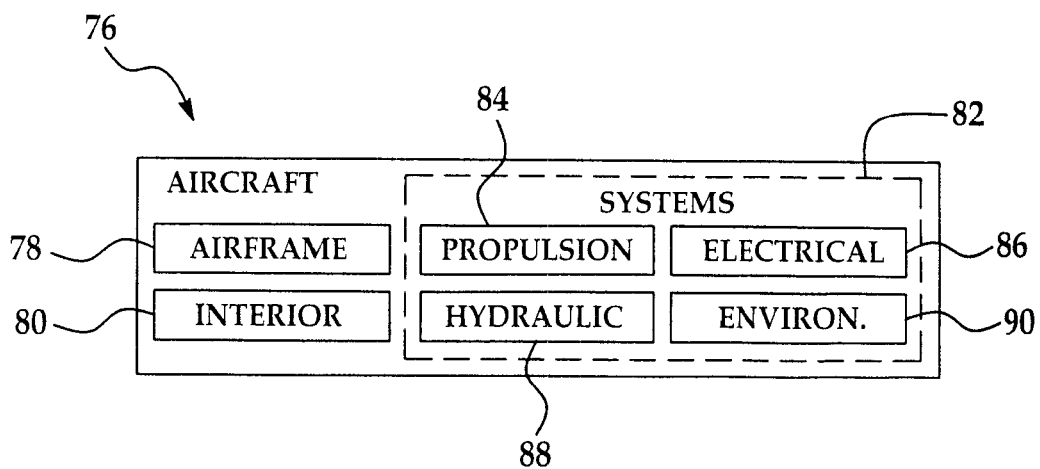
FIG. 14 is a block diagram of an aircraft.

Referring now to FIGS. 13 and 14, embodiments of the disclosure may be used in the context of an aircraft manufacturing and service method 60 as shown in FIG. 13 and an aircraft 76 as shown in FIG. 14. During pre-production, exemplary method 60 may include specification and design 62 of the aircraft 76 and material procurement 64. During production, component and subassembly manufacturing 66 and system integration 68 of the aircraft 76 takes place. Thereafter, the aircraft 76 may go through certification and delivery 70 in order to be placed in service 72. While in service by a customer, the aircraft 76 is scheduled for routine maintenance and service 74 (which may also include modification, reconfiguration, refurbishment, and so on).

Each of the processes of method 60 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 14, the aircraft 76 produced by exemplary method 60 may include an airframe 78 with a plurality of systems 82 and an interior 80. Examples of high-level systems 82 include one or more of a propulsion system 84, an electrical system 86, a hydraulic system 88, and an environmental system 90. Any number of other systems may be included. Although an aerospace example is shown, the principles of the invention may be applied to other industries, such as the automotive industry.

The apparatus embodied herein may be employed during any one or more of the stages of the production and service method 60. For example, components or subassemblies corresponding to production process 66 may be fabricated or manufactured in a manner similar to components or subassemblies produced while the aircraft 76 is in service. Also, one or more apparatus embodiments may be utilized during the production stages 66 and 68, for example, by substantially expediting assembly of or reducing the cost of an aircraft 76. Similarly, one or more apparatus embodiments may be utilized while the aircraft 76 is in service, for example and without limitation, to maintenance and service 74.

Although the embodiments of this disclosure have been described with respect to certain exemplary embodiments, it is to be understood that the specific embodiments are for purposes of illustration and not limitation, as other variations will occur to those of skill in the art.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. Friction stir welding apparatus, comprising:
a shoulder tool;
a pin tool rotatable within the shoulder tool, the pin tool and the shoulder tool independently rotatable and coaxial with respect to one another;
a spindle housing;
first and second coaxial spindle shafts respectively connected to the shoulder tool and the pin tool, the first and second coaxial spindle shafts independently rotatable with respect to one another, the first spindle shaft surrounding the second spindle shaft;
a first motor surrounding and directly connected to the first spindle shaft and adapted to rotate the shoulder tool; and
a second motor surrounding and directly connected to the second spindle shaft, the second motor arranged concentrically and coaxially with the first motor along a common axis in the spindle housing, the second motor slideably mounted for linear movement along the common axis within the spindle housing, and adapted to rotate the pin tool.

2. The apparatus of claim 1, wherein the first motor includes a stator, and a rotor secured to and surrounding the first spindle shaft, the rotor directly attached to the upper end of the first spindle shaft.

3. The apparatus of claim 1, wherein the second motor include a stator, and a rotor secured to and surrounding the second spindle shaft, the rotor directly attached to the upper end of the second spindle shaft.

4. The apparatus of claim 1, further comprising first and second encoders for encoding information related to the rotation of the first and second spindle shafts.

5. The apparatus of claim 1, wherein the second spindle shaft passes through the first motor.

6. The apparatus of claim 1, wherein the first and second motors are electric motors.

7. Friction stir welding apparatus, comprising:
a shoulder tool;
a pin tool coaxial with and rotatable within the shoulder tool, the pin tool and the shoulder tool independently rotatable with respect to one another;
first and second coaxial spindle shafts respectively connected to the shoulder tool and the pin tool, the first and second coaxial spindle shafts independently rotatable with respect to one another, the first spindle shaft surrounding the second spindle shaft;
a first motor surrounding and coaxial with and directly connected to the first spindle shaft and adapted to rotate the shoulder tool; and
a second motor surrounding and coaxial with and directly connected to the second spindle shaft and adapted to rotate the pin tool, the first and second motors arranged concentrically and coaxially along a common axis in a spindle housing, the second motor slideably mounted for linear movement along the common axis within the spindle housing.

8. The apparatus of claim 7, wherein the shoulder tool, the pin tool, the first spindle shaft, the second spindle shaft, the first motor and the second motor are coaxial.

9. The apparatus of claim 7, wherein the first motor includes: a stator, and a rotor secured to the first spindle shaft, the rotor directly attached to the upper end of the first spindle shaft.

10. The apparatus of claim 9, wherein the second motor includes: a stator, and a rotor secured to the second spindle shaft, the rotor directly attached to the upper end of the second spindle shaft.

11. The apparatus of claim 7, further comprising first and second encoders for encoding information related to the rotation of the first and second spindle shafts.

12. The apparatus of claim 7, where the second spindle shaft passes through the first motor.

13. The apparatus of claim 7, further comprising: means for mounting the second motor for linear sliding movement toward and away from the first motor; and, a power drive for linearly displacing the second motor.

14. Friction stir welding apparatus, comprising:
first and second electric motors arranged concentrically and coaxially along a common axis in a spindle housing and arranged to drive around the common axis, the second electric motor slideably mounted for linear movement along the common axis within the spindle housing;
a shoulder tool;
a pin tool rotatable within the shoulder tool around the common axis, the pin tool and the shoulder tool independently rotatable and coaxial with respect to one another;
a first spindle shaft rotatably connecting the shoulder tool with the first motor, the first motor surrounding the first spindle shaft; and
a second spindle shaft directly connecting the pin tool with the second motor, the second motor surrounding the second spindle shaft;
wherein the first and second coaxial spindle shafts are independently rotatable with respect to one another, the first spindle shaft surrounding the second spindle shaft.

15. The apparatus of claim 14, wherein the first motor includes: a stator, and a rotor secured to the first spindle shaft, the rotor directly attached to the upper end of the first spindle shaft.

16. The apparatus of claim 14, wherein the second motor includes: a stator, and a rotor secured to the second spindle shaft, the rotor directly attached to the upper end of the second spindle shaft.

17. The apparatus of claim 14, further comprising means for generating a parameter related to the rotation of the first and second spindle shafts.

18. The apparatus of claim 14, wherein the second spindle shaft passes through the first motor.

19. The apparatus of claim 14, wherein the second motor is mounted for linear movement along the common axis.

* * * * *